Reissued Feb. 27, 1951

Re. 23,344

UNITED STATES PATENT OFFICE 23,344

PRODUCTION OF GLUTAMIC ACID

Forest A. Hoglan and Morris J. Blish, Toledo, Ohio, assignors to International Minerals and Chemical Corporation, a corporation of New York No Drawing. Original No. 2,525,902, dated October 17, 1950, Serial No. 752,826, June 5, 1947. Application for reissue November 27, 1950, Serial No. 197,823

7 Claims. (Cl. 260—529)

Matter enclosed in heavy brackets [ ] appears in the original patent but forms no part of this reissue specification; matter printed in italics indicates the additions made by reissue

This invention relates to improvements in the process of producing [D-]*L*-glutamic acid from protein and other glutamic acid mother substances. More particularly, this invention relates to improvements in a process for producing [D-]*L*-glutamic acid by separately hydrolyzing a protein and Steffen's filtrate, and combining the two types of hydrolysates prior to recovering [D-]*L*-glutamic acid from same.

[D-]*L*-glutamic acid, known in the food industry as "glutamic acid" and hereinafter referred to by such term, has been prepared in the past by the hydrolysis of various glutamic acid mother substances such as wheat gluten, corn gluten, and other grain proteins, and also by the hydrolysis of glutamic acid mother substances which are present in Steffen's filtrate. For example, wheat gluten has been hydrolyzed with mineral acids such as sulfuric acid, hydrochloric acid, etc., and the resultant hydrolysates have been treated chemically in order to produce glutamic acid of varying degrees of purity. Steffen's filtrate—which is a dilute solution of waste products from the desugarization of sugar beet solutions—contains approximately 3.0% solids comprising inorganic salts such as sodium, potassium, and calcium salts, small quantities of sugars, and nitrogenous organic materials including betaine, various amino acids, and glutamic acid mother substances. Steffen's filtrate has been hydrolyzed in the past by either acid or alkaline hydrolysis, in order to recover glutamic acid therefrom, together with betaine and small quantities of other amino acids. It has previously been proposed to combine an acid hydrolysate of a protein—for example, wheat gluten—with an alkaline hydrolysate of Steffen's filtrate, whereby the pH of the combined hydrolysate is adjusted to a value of about 3.2, which is the isoelectric point of glutamic acid in aqueous solutions. This process produces a rather low grade of glutamic acid, due to the fact that dark-colored insoluble organic material including humin, amino acid values other than glutamic acid, including tyrosine and leucine, and inorganic salts are not removed to any appreciable extent from the crude product. According to the present invention, however, removal of the aforesaid dark-colored organic matter, amino acid values other than glutamic acid, and a substantial portion of the contaminating inorganic salts is accomplished prior to the recovery of glutamic acid from the combined hydrolysates. Therefore, by adopting the process which is the subject of this invention, the glutamic acid which is produced requires very little, if any, purification; thereby substantially reducing the cost of the final product, as well as markedly increasing its degree of purity. Furthermore, the amino acid values other than glutamic acid which are removed prior to the recovery of glutamic acid are isolated in a single step and may be recovered for other useful purposes.

It is an object of the invention to provide a new and improved process for the production and recovery of glutamic acid from Steffen's filtrate and protein.

Another object of the invention is to provide a new and improved process for the production and recovery of glutamic acid from acid protein hydrolysates and alkaline Steffen's filtrate hydrolysates.

Another object of the invention is to provide a new and improved process for the production and recovery of glutamic acid from acid protein hydrolysates and alkaline Steffen's filtrate hydrolysates, whereby glutamic acid is recovered substantially free from impurities.

Another object of the invention is to provide a new and improved process for the production of glutamic acid from acid protein hydrolysates and alkaline Steffen's filtrate hydrolysates, whereby the cost of producing glutamic acid from these raw material sources is substantially reduced in comparison to prior methods.

In accordance with the process herein described, a protein such as soybean meal, wheat gluten, or corn gluten, is hydrolyzed with a mineral acid such as sulfuric acid, hydrochloric acid, etc., at temperatures between about 100° C. and about 125° C., until hydrolysis is substantially complete. Steffen's filtrate is separately hydrolyzed by employing an alkaline reagent such as alkali metal hydroxides, or alkaline earth metal oxides and/or hydroxides, usually not in excess of about 10% by weight of Steffen's filtrate. The alkaline hydrolysis is usually conducted at temperatures not greater than 100° C. until hydrolysis is substantially complete. The two hydrolysates are then combined to give a pH between about 5.0 and about 7.0. Insoluble organic matter, including humin, and insoluble salts are separated from the combined hydrolysates, and the resultant filtrate is concentrated to a point where incipient crystallization of salts may occur. The precipitated salts are removed from the concentrate, together with amino acid values other than glutamic acid values which crystallize from the combined hydrolysates at this point. The pH of the resultant filtrate is adjusted to about 3.2, and glutamic acid crystallizes and is recovered from this solution.

More particularly, a vegetable protein—for example, wheat gluten—is hydrolyzed with from one to two parts by weight of a nonoxidizing mineral acid—for example, hydrochloric acid about 25 to about 36% HCl)—at a temperature between about 100° C. and about 125° C., for a period of time which is sufficient to substantially hydrolyze the glutamic acid mother substances. A period of about three hours is usually sufficient. Alkaline hydrolysis of Steffen's filtrate is separately accomplished by first concentrating said filtrate to a specific gravity between about 1.3 and about 1.4, and then heating with an alkaline reagent not in excess of 10% of the weight of the concentrated Steffen's filtrate. Preferably about 8% by weight of sodium hydroxide is employed. The hydrolysis is conducted at a temperature not greater than 100° C. and preferably at about 85° C., for a period of time sufficient to substantially hydrolyze the glutamic acid mother substances. Usually two and one-half hours will suffice. The hydrolysates are cooled to about room temperature and are then combined in amounts such as to give the final combined hydrolysate a pH between about 5.0 and about 7.0, preferably between about 5.0 and about 5.5. The combined hydrolysates are suitably heated at a temperature between about 50° C. and about 60° C., and filtered in order to remove insoluble dark-colored organic matter including humin, together with insoluble salts. The resultant solution is then concentrated at least to the point of incipient crystallization of salts, and after standing for several hours, at a temperature between about 20° C. and about 50° C., the precipitated salts and amino acid values other than glutamic acid—for example, tyrosine, leucine, and other amino acids—are removed by filtration, preferably at a temperature between about 40° C. and about 60° C. The pH of the resultant filtrate is adjusted to about 3.2 with a mineral acid—for example, hydrochloric acid—and is allowed to stand for several days to permit crystallization of glutamic acid. The crystallized glutamic acid is separated from the solution and, if desired, is repulped with about 60% by weight of water. The product is then dried. The glutamic acid so produced has a purity between about 92% and about 95%. This product may be either further purified or converted directly into monosodium glutamate, which product finds wide usage as a food flavoring material.

In another embodiment of the invention, the humin and other insoluble material may be separated from the acid hydrolysate prior to the combining of the alkaline Steffen's filtrate hydrolysate therewith. The procedural steps are otherwise substantially identical to those described above.

In a further embodiment of the invention, the removal of humin and other insoluble material from either the acid hydrolysate or the combined hydrolysates at a pH between about 5.0 and about 7.0 may be eliminated, if desired, and the combined hydrolysates can be concentrated directly, with subsequent removal of the aforesaid insoluble material from the concentrate, together with salts and amino acid values other than glutamic acid. The subsequent recovery of glutamic acid is substantially the same as previously described herein.

In order to afford a more complete description of the invention, but with no intention of being limited thereby, the following example is given:

*Example*

About 200 grams of wheat gluten (80% protein) is hydrolyzed by heating with about 400 grams of hydrochloric acid (about 26% HCl) at a temperature of about 125° C., for about three hours.

Alkaline hydrolysis of Steffen's filtrate:

About one kilogram of concentrated Steffen's filtrate (specific gravity about 1.32 at 24° C.) is hydrolyzed by heating at about 85° C. with about 162 grams of 50% sodium hydroxide solution, for a period of about two and one-half hours.

The above hydrolysates are cooled approximately to room temperature and are then combined, in amounts required, to give a pH between about 5.0 and about 5.5 to the resultant combined hydrolysate. Usually a quantity of alkaline hydrolysate equivalent to about 750 grams of concentrated Steffen's filtrate will be required to neutralize the above acid hydrolysate to the prescribed pH. The combined hydrolysates are warmed to a temperature between about 50° C. and about 60° C., and filtered to remove humin and other insoluble material. This filtration is preferably accomplished with a suitable filter-aid, such as "dicalite." The resultant solution is concentrated to about 1200 grams, allowed to cool to room temperature, and is maintained at room temperature for several hours in order to permit crystallization of salts, residual humin, and amino acid values other than glutamic acid—for example, tyrosine, leucine, and other amino acids. The precipitated solids are separated at a temperature of about 50° C., and the pH of the resultant filtrate is adjusted to about 3.2 with about 200 grams of concentrated hydrochloric acid (about 36% HCl). The resultant solution is allowed to stand for several days to permit crystallization of glutamic acid. The separated glutamic acid may be dried and packaged as such, or, preferably, it is repulped with about 60% by weight of water, and then dried. The purity of the repulped glutamic acid is usually between about 92% and about 95%. Ordinarily, about 105 to about 110 grams of glutamic acid is obtained in this process.

This product is of sufficient purity for conversion into monosodium glutamate by means of several well-known procedures; for example, by reacting the glutamic acid with one equivalent of sodium hydroxide or sodium bicarbonate in water.

While the above example illustrates the use of hydrochloric acid as a hydrolyzing reagent for gluten, the use of other mineral acids such as sulfuric acid, phosphoric acid, etc., are deemed to be within the spirit and scope of the invention. Similarly, alkaline reagents such as potassium hydroxide and calcium oxide or calcium hydroxide may be substituted for sodium hydroxide in the alkaline hydrolysis of Steffen's filtrate. In any case, the hydrolysates are combined to the prescribed pH level in order to separate substances which ordinarily contaminate the desired glutamic acid.

Obviously, the invention is not limited to the procedural details stated, but may be carried out by obvious extensions of the several factors recited.

What is desired to be claimed by Letters Patent is:

1. The process of producing [D-]L-glutamic acid which comprises separately preparing an acid hydrolysate of a protein and an alkaline hydrolysate of Steffen's filtrate, combining the two hydrolysates to give a pH between about 5.0 and about 7.0, concentrating the resultant solution at least to the point of incipient crystallization, separating therefrom a mixture containing salts, amino acid values other than [D-]L-glutamic acid values, and insoluble material, adjusting the pH of the resultant solution to about 3.2 and recovering [D-]L-glutamic acid therefrom.

2. The process of producing [D-]L-glutamic acid which comprises separately preparing an acid hydrolysate of a protein and an alkaline hydrolysate of Steffen's filtrate, combining the two hydrolysates to give a pH between about 5.0 and about 7.0, separating humin and other insoluble material from the combined hydrolysates, concentrating the resultant solution at least to the point of incipient crystallization, crystallizing and separating therefrom a mixture containing salts and amino acid values other than [D-]L-glutamic acid values, adjusting the pH of the resultant solution to about 3.2 and recovering [D-]L-glutamic acid therefrom.

3. The process of producing [D-]L-glutamic acid which comprises separately preparing an acid hydrolysate of a protein and an alkaline hydrolysate of Steffen's filtrate, separating humin from the acid hydrolysate, combining the resultant acid hydrolysate with the alkaline hydrolysate to give a pH between about 5.0 and about 7.0, concentrating the resultant solution at least to the point of incipient crystallization, crystallizing and separating therefrom a mixture containing salts and amino acid values other than [D-]L-glutamic acid values, adjusting the pH of the resultant solution to about 3.2 and recovering [D-]L-glutamic acid therefrom.

4. The process of producing [D-]L-glutamic acid which comprises hydrolyzing a protein with a nonoxidizing mineral acid and separately hydrolyzing Steffen's filtrate with an inorganic alkaline compound, combining the two hydrolysates to give a pH between about 5.0 and about 7.0, separating humin and other insoluble material from the combined hydrolysates, concentrating the resultant solution at least to the point of incipient crystallization, lowering the temperature of the concentrate, crystallizing and separating therefrom a mixture containing salts and amino acid values other than [D-]L-glutamic acid values, adjusting the pH of the resultant solution to about 3.2 and recovering [D-]L-glutamic acid therefrom.

5. The process of producing [D-]L-glutamic acid which comprises hydrolyzing a protein with hydrochloric acid (about 26% HCl) and separately hydrolyzing Steffen's filtrate with sodium hydroxide, combining the two hydrolysates to give a pH between about 5.0 and about 7.0, separating humin and other insoluble material from the combined hydrolysates, concentrating the resultant solution at least to the point of incipient crystallization, lowering the temperature of the concentrate, crystallizing and separating therefrom a mixture of salts and amino acid values other than [D-]L-glutamic acid values, adjusting the pH of the resultant solution to about 3.2 and recovering [D-]L-glutamic acid therefrom.

6. The process of producing [D-]L-glutamic acid which comprises hydrolyzing a vegetable protein with hydrochloric acid (about 25 to about 36% HCl) and separately hydrolyzing Steffen's filtrate with sodium hydroxide, separating humin from the acid hydrolysate, combining the resultant acid hydrolysate with the alkaline hydrolysate to give a pH between about 5.0 and about 7.0, separating insoluble material from the combined hydrolysates, concentrating the resultant solution at least to the point of incipient crystallization, lowering the temperature of the concentrate, crystallizing and separating therefrom a mixture containing salts and amino acid values other than [D-]L-glutamic acid values, adjusting the pH of the resultant solution to about 3.2 and recovering [D-]L-glutamic acid therefrom.

7. The process of producing [D-]L-glutamic acid which comprises hydrolyzing wheat gluten with hydrochloric acid (about 25 to about 36% HCl) and separately hydrolyzing Steffen's filtrate with about 8.0% by weight of sodium hydroxide based on the weight of Steffen's filtrate, combining the two hydrolysates to give a pH between about 5.0 and about 5.5, separating humin and other insoluble material at a temperature between about 50° C. and about 60° C., concentrating the resultant solution to the point of incipient crystallization, lowering the temperature of the concentrate to between about 20° C. and about 50° C., crystallizing and separating therefrom a mixture of salts and amino acid values other than [D-]L-glutamic acid values at a temperature between about 40° C. and about 60° C., adjusting the pH of the resultant solution to about 3.2 with hydrochloric acid and recovering [D-]L-glutamic acid therefrom.

FOREST A. HOGLAN.
MORRIS J. BLISH.

REFERENCES CITED

The following references are of record in the file of this patent or the original patent:

UNITED STATES PATENTS

| Number | Name | Date |
|---|---|---|
| 2,241,927 | Sahyun | May 13, 1941 |
| 2,373,342 | Royal | Apr. 10, 1945 |
| 2,405,223 | Manning | Aug. 6, 1946 |